(12) United States Patent
Weber

(10) Patent No.: US 7,244,364 B1
(45) Date of Patent: Jul. 17, 2007

(54) FCC-CFD CAT' FINE DESALTING: A METHOD AND SYSTEM FOR SEPARATING HYDROCARBONS AND EXTRACTING CATALYST FINES FROM A SLURRY OIL/CATALYST FINES/DILUENT MIXTURE

(76) Inventor: Larry J. Weber, 4318 Delor, St. Louis, MO (US) 63116

( * ) Notice: Subject to any disclaimer, the term of this patent is extended or adjusted under 35 U.S.C. 154(b) by 395 days.

(21) Appl. No.: 10/640,143

(22) Filed: Aug. 13, 2003

Related U.S. Application Data

(60) Provisional application No. 60/403,067, filed on Aug. 13, 2002.

(51) Int. Cl.
*B01D 21/01* (2006.01)
*B01D 17/04* (2006.01)

(52) U.S. Cl. .................... 210/729; 210/708; 210/723; 210/737

(58) Field of Classification Search ................ 210/729, 210/708, 723, 737; 196/46; 208/251 R, 208/161, 162
See application file for complete search history.

(56) References Cited

U.S. PATENT DOCUMENTS

| | | | | |
|---|---|---|---|---|
| 2,384,967 A | * | 9/1945 | Schumacher et al. | ......... 208/97 |
| 2,952,620 A | * | 9/1960 | Wade | ......... 208/162 |
| 6,228,239 B1 | * | 5/2001 | Manalastas et al. | ......... 204/567 |

* cited by examiner

*Primary Examiner*—Glenn Caldarola
*Assistant Examiner*—John Douglas
(74) *Attorney, Agent, or Firm*—Polster, Lieder, Woodruff & Lucchesi, LC

(57) ABSTRACT

The present invention comprises a method for separating hydrocarbons from catalyst fines in a slurry oil/catalyst fines/diluent mixture (SCDM) comprising the steps of removing SCDM from a slurry oil storage tank and combining the SCDM with crude oil entering a desalter in order to separate the slurry oil from the catalyst fines, whereby the desalter causes the hydrocarbon content of the SCDM to exit the desalter with dehydrated hydrocarbon from the crude oil while catalyst fines exit the desalter with basic sediment and water removed from the crude oil.

8 Claims, 1 Drawing Sheet

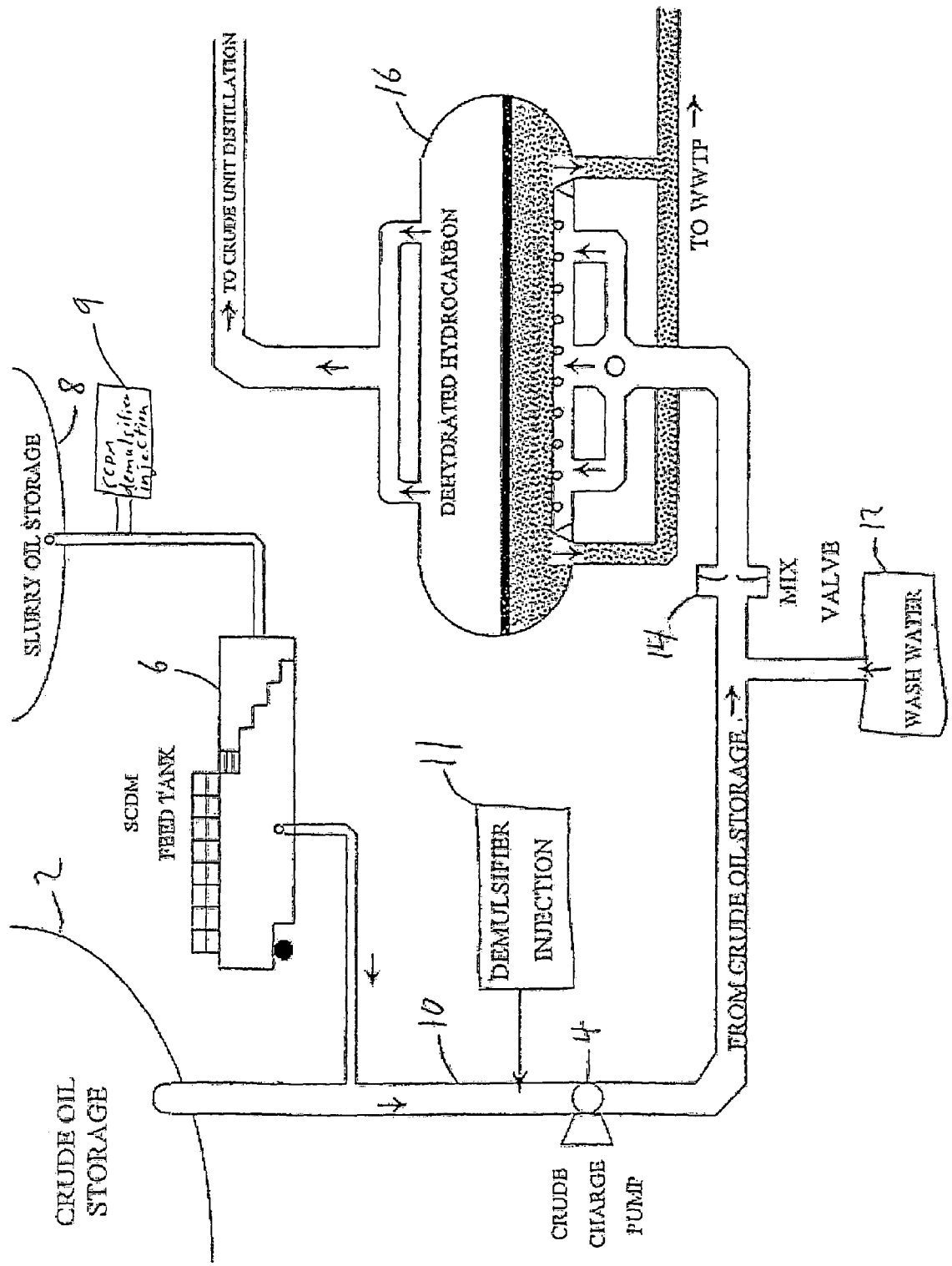

FCC-CFD CAT' FINE DESALTING: A METHOD AND SYSTEM FOR SEPARATING HYDROCARBONS AND EXTRACTING CATALYST FINES FROM A SLURRY OIL/CATALYST FINES/DILUENT MIXTURE

RELATED APPLICATIONS

The present application claims priority to U.S. Provisional Patent Application No. 60/403,067 filed Aug. 13, 2002 the contents of which are expressly incorporated herein by reference.

FIELD OF THE INVENTION

The present invention relates to a system and method for extraction of catalyst fines from a slurry oil, catalyst fines and diluent mixture (SCDM) in a petroleum refining process while recycling the slurry oil and diluent in an efficient manner.

BACKGROUND OF THE INVENTION

Slurry Oil/Catalyst Fines Tank Bottoms Recovery & Processing

The problems presented by catalyst attrition from fluid catalytic cracking units (FCCU) have plagued the refining industry since the advent of fluid catalytic cracking in the first half of the 20th century. Over time, FCCU catalyst deteriorates in size. The size deteriorated catalyst is commonly referred to as catalyst fines.

In the FCCU process, cracked product stream vapor and some catalyst (typically of less than 20 microns in diameter) leave the reactor and enter the main fractionator near its base. On most units the bottom stream from the fractionator is called heavy cycle oil (HCO) or slurry oil. HCO has a typical gravity of from about –4.0 API to about 3 API. For purposes of the present invention, it is sufficient to know that catalyst fines of about 20 microns in diameter or less, make their way to the slurry oil product storage tank. Slurry oil is a saleable product of FCCU processing. Once in the storage tank, the catalyst fines settle to the bottom, albeit very slowly.

The existence of catalyst fines in the slurry tank presents a variety of problems to the refiner. The immediate and obvious problem has to do with product contamination. Slurry oil has proven to be an ideal feedstock for carbon black manufacture. Utilization as carbon black feedstock maximizes the value of slurry oil product. However, the presence of catalyst fines above a specified percentage in the slurry oil product results in an "ash content" specification in excess of that which is acceptable for use of the slurry oil as a carbon black feedstock. Even when the slurry oil product is utilized as a fuel source, a "price penalty" is, effectively, rendered by the market place as a result of ash content, in the form of the inorganic catalyst fines.

Firms within the specialty chemical industry, which service the petroleum refining industry, have built proprietary product lines that serve to enhance settling of the catalyst fines. In recently or relatively recently cleaned storage tanks this procedure is typically successful in enabling the stored slurry oil product to meet even the rigorous specifications of carbon black manufacturers. As the accumulation of catalyst fines continues in the storage tank, a time comes when no amount of settling enhancement will permit the stored product to "meet specifications" of carbon black manufacturers or even fuel products.

When accumulation of catalyst fines in the slurry oil storage tank becomes intolerable, in terms of meeting product specification, refinery management schedules a clean-out. The clean-out is conducted under one of two typical scenarios. One type of clean-out calls for the removal of the catalyst fines without human entry. In this instance, enough of the catalyst fine sediment is removed to make the bottoms manageable once again. The second type of clean-out entails a complete removal of all catalyst fine sediment, subsequent human entry for complete clean up, a so-called mop-up, all followed by inspection, repairs and return-to-service.

The low API/high density of the slurry oil, coupled with the entrained catalyst fines, contributes to recovery and handling problems that are reputed to be some of the toughest in the tank cleaning industry. The tank cleaning industry has devised a number of procedures for catalyst fine removal from slurry oil storage tanks. These include the injection of diluent at high pressure either via side ports or from the roof, the cutting of "door sheets" using a water torch and various probe insertion devices. One such insertion device was co-invented by the present inventor and is called the SWEEPBER and is the subject of U.S. Pat. No. 6,142,160, which serves the purpose of recovering catalyst fines from the bottom of slurry oil storage vessels. A diluent is required to enhance ease of handling of the catalyst fine bottoms in all instances known to this inventor. The observed diluent of choice is Light Cycle Oil or LCO, a side-cut of the FCCU fractionator.

The overwhelming preponderance of catalyst fine projects are then conducted in a manner described as follows: As removal from the tank is carried out the typical procedure calls for transfer of the slurry oil/catalyst fines/diluent mixture (hereinafter "SCDM") to a mobile mix tank, such as that supplied by Baker Tanks Inc., of approximately 22,000 gallons (approximately 500 barrels) capacity. The mix tank has the capability of heating the contents. A heated catalyst fine suspension of pre-specified temperature and concentration is then prepared, in the mix tank, as feed for centrifuge processing.

The heated feed is charged to the centrifuge and processed at a typical rate of 35 gallons per minute to 42 gallons per minute. Two streams result from the centrifuge process. One stream is referred to as recovered oil; the second stream is referred to as "filter cake". The recovered oil is utilized per refinery management discretion. A typical option is to blend the recovered oil into heavy fuel oil products.

Pursuant to current U.S. Environmental Protection Agency guidelines, the filter cake is considered a hazardous waste. The cost of hazardous waste disposal has risen by ten fold in the last decade and is expected to continue rising. The principal specification that governs the acceptability of filter cake for disposal to a hazardous waste landfill is the "paint filter test". This test requires the absence of free flowing oil through a standard filter. However, despite the absence of free-flowing oil within the filter cake, a substantial amount of hydrocarbon content remains within the filter cake and, thus, goes unutilized.

It is not unusual to find that the true hydrocarbon content of post-centrifuged filter cake is greater than 50%. It has been observed that filter cake of high melting point hydrocarbons, such as slurry oil, may contain as much as 83% hydrocarbon. The determination of true hydrocarbon content may be found by conducting a standard ASTM procedure for oil and grease or a true distillation.

There is a currently-used, second method of disposal for filter cake that renders the cake non-hazardous under EPA guidelines. The method is described in U.S. Pat. No. 5,443,717 to Robert M. Scalliet, et al. entitled "Recycle of Waste Streams".

The Refinery Desalting Process

On the front line of defense in preventing refinery, process-side corrosion and processing unit contamination is the crude unit desalter. Despite the name, the desalter serves two principal functions: A) to minimize the chloride contamination and contamination by other water soluble, deleterious chemistries, found in raw crude oil, by precluding their introduction into the crude unit and downstream processes and B) to minimize and/or preclude the introduction of so-called "Basic Sediment and Water" (BS&W) into the crude unit and downstream processes.

The desalting process takes place in the desalter vessel. The desalter may be likened to a crude oil washing machine. Simply described, the desalting process consists of adding wash water to raw crude oil and then mixing the wash water with the raw crude such that the water makes contact with both soluble chemical contaminants and insoluble sediments. The wash water extracts the inorganic salts and other water-soluble chemistries. Further, under ideal conditions, the wash water serves to "water wet" insoluble sediments rendering them hydrophilic.

The objective to desalting optimization is to bring about a resolution of the oil water emulsion that has been purposely created by injecting a water wash into the crude charge prior to the mix valve. Two of the principal contributors to dehydration of the emulsified raw crude oil, not necessarily in order of importance, are A) the application of a treatment additive, commonly referred to as a demulsifier, that serves to promote coalescence of the water and B) the passing of the crude oil emulsion through an electric field, created within the desalter, that serves to enhance an electrostatic coalescing process.

The two factors previously referenced, the treatment additive and the electrostatic coalescing field, are by no means the only contributors to desalter opt optimization. Additional parameters that contribute to desalter optimization are referenced in the section herein below entitled: Translating Bench Model Results To Commercial Scale Practice. When all variables are set satisfactorily, dehydration of the crude emulsion will occur with a simultaneous migration of the cat' fine component of the SCDM into the water phase of the desalting process. The mechanism for dehydration is suggested by a coalescence of water droplets, which settle according to Stokes Law. As settling of the water occurs, both soluble contaminants and water-wetted sediments are carried downward, out of the hydrocarbon phase and into the lower water layer, which is maintained in the desalter. In the desalter, this process takes place on a continuous basis with dehydrated hydrocarbon rising upward and out of the top of the desalter vessel while, simultaneously, water settles downward and is pumped out of the desalter and through piping at the desalter bottom. The so-called desalter effluent water carries with it both the soluble chemical contaminants and the water-wetted, insoluble sediment in the form of the original crude oil inorganic contaminants and cat' fines introduced by the SCDM.

Prior to being charged into the desalter, a water wash is injected into the crude stream. The wash water is mixed into the crude by means of a special piece of hardware termed a mix valve. The mix valve is designed to create a repeatable mixing shear such that the wash water and raw crude oil may be mixed in a predictable manner that can be duplicated and repeated. The determination of the precise mix valve setting is paramount to the achievement of desalter optimization as is the amount and source of the water wash. The previous description of the desalting process, which is essentially a deliberate emulsification followed by a dehydration process, is widely held to be as much an art as a science by those professionals who specialize in the craft of optimizing desalter operation.

SUMMARY OF THE INVENTION

The present invention comprises a method for separating hydrocarbons from catalyst fines in a slurry oil/catalyst fines/diluent mixture (SCDM) comprising the steps of removing SCDM from a slurry oil storage tank and combining the SCDM with crude oil entering a desalter in order to separate the slurry oil from the catalyst fines, whereby the desalter causes the hydrocarbon content of the SCDM to exit the desalter with dehydrated hydrocarbon from the crude oil while catalyst fines exit the desalter with basic sediment and water removed from the crude oil.

Of particular note to this section are the highly detrimental consequences of the formation of an emulsion in the context of desalter processing operations. The typical specification for the so-called "desalted crude" leaving the desalter as charge to crude unit operations is A. Less than one pound of chlorides per thousand barrels of crude (2.86 ppm), B. Less than 0.2% water and C. Less than 0.05% sediment or inorganic solids. Optimum desalter operation is characterized by an upper layer of desalted crude oil and a lower layer of water, most of which is the remnants of the wash water previously introduced. The water serves to transport both deleterious soluble salts and inorganic solids out of the desalter. This refuse stream is channeled to the refinery waste water treatment plant (WWTP) that is specially equipped to deal with the inorganic solid waste. Typically, a very narrow emulsion band (2 inches or less) will develop, within the desalter, at the interface of the oil and water layers. The undesirable nature of an emulsion band is highlighted by the derogatory term that those, skilled in the art of desalting, apply to it, i.e., "the rag layer". Optimum desalter operations are characterized by an emulsion band of a few inches or less to the vertical and never more than a foot if possible.

Desalter upset conditions arise when the emulsion band, within the desalter, begins to expand. As the emulsion band widens, the solids and water components of the emulsion are elevated toward the crude oil discharge line located at the top of the desalter vessel. Once the emulsion band becomes too great in width the phenomenon of solids and water carry-over occurs and the objectives of desalting are not attained. This is represented by the analysis of crude, exiting the desalter, exceeding the specifications previously described. A severe desalter upset, whereby wash water containing copious amounts of chlorides or other corrosive chemistry makes its way to the crude tower overhead, can result in corrosion through the overhead system of the crude tower creating a highly dangerous potential for fire within the refinery. The negative consequences of emulsion formation, in the context of desalter processing operations, cannot be overemphasized.

BRIEF DESCRIPTION OF THE DRAWINGS

FIG. 1 is a diagrammatic view of the system of the present invention.

DESCRIPTION OF THE PREFERRED EMBODIMENT

While the invention is susceptible of embodiment in many different forms, there is described in detail preferred embodiments of the invention. It is to be understood that the present disclosure is to be considered only as an example of the principles of the invention. This disclosure is not intended to limit the broad aspect of the invention to the illustrated embodiments. The scope of protection should only be limited by the claims.

In a broad overview of the present invention, the recovery of hydrocarbons within SCDM and the treatment of catalyst fines, such that they extracted, is accomplished by mixing the SCDM with crude oil before the crude oil enters the desalter. Once in the desalter, the hydrocarbon content of the SCDM is extracted into the crude oil and sent to the crude distillation unit fractionator while catalyst fines are removed as is other ordinary sediment within the desalter.

In order to utilize the present invention on a production scale, it is first necessary to optimize the processing condition through bench modeling. After an appropriate bench model has been formulated, the process is incorporated in production equipment where further enhancements to the process may be performed.

Also, as a precautionary note, all laboratory testing should be conducted within the constraints of generally accepted laboratory safety procedures. Bench modeling requires the heating of semi-volatile crude oil systems, which may contain volatile hydrocarbons that result in increased pressure when heated. All containment vessels should be certified explosion proof for pressures anticipated by the procedure.

In order to perform the appropriate bench modeling of the desalting process, samples of upcoming crude unit charge blends, as well as samples of the SCDM to be processed, are procured. The samples of crude oil and SCDM are washed with water with samples of the wash water that will be used in the production-scale process. Next a choice is made as to the most desirable crude unit charge blend in the context of crude availability.

As a starting point it is preferred that an SCDM is prepared such that a 1 part addition of SCDM to 99 parts of the chosen crude slate will result in a concentration of less 0.4% BS&W in the SCDM/Crude mixture. The present invention is not limited to 0.4% BS&W. The SCDM is then heated to 125° F. to 180° F. in a water bath and stirred. 198 milliliters of raw crude are stirred at ambient temperatures or at a temperature at which the crude oil will exist at the point of injection of SCDM, as anticipated for the commercial scale processing. Two (2) milliliters of SCDM are added to the 198 milliliters of raw crude from the previous step and stirred until the mixture is homogenous.

The bench model may be constructed using a water bath or, alternatively, an electrostatic precipitator device, available in the market place, which serves to simulate the desalting process. The desalting simulating apparatus serves to incorporate electrostatic coalescence into the bench modeling procedure. If constructing a bench model without the desalter simulating apparatus, the SCDM/raw crude mixture is transferred to a containment vessel capable of minimizing the loss of light hydrocarbon components at a temperature of 180° F. The vessel containing the mixture is placed in a water bath at 180° F. The water bath should be located in a fume hood. The containment vessel must be of adequate construction to assure that light hydrocarbon components, heated to 180, will not create a pressure sufficient to explode the vessel. The wash water sample is heated to 200° F.

A blender jar, constructed of glass or stainless steel with a lid and mixing components, impervious to organic solvent attack, is heated in a water bath to 205° F. A demulsifier treatment additive is selected for testing. A treatment rate at which the additive is to be injected is also chosen. A blender system, associated with the blender jar, is arranged for easy access. The blender system is controlled via a variable transformer. The variable transformer should have settings ranging from 0 to 100. Settings, for both the blender system and the variable transformer, are chosen for the first bench-model test.

The vessel containing the SCDM/raw crude mixture is opened, carefully and inside the fume hood, such that pressure, created by volatilized light hydrocarbon components, may be vented safely. The chosen demulsifier, at the chosen dosage rate, is injected into the SCDM/raw crude mixture.

The vessel is sealed and then shaken for at least 150 seconds. This step simulates the dispersion of demulsifier throughout the SCDM/raw crude mixture. A standard laboratory shaker is used so that the shaking or mixing procedure is repeatable. The container is then returned to the water bath and raised to a temperature of 180° F.

When the SCDM/raw crude has reached 180° F., the mixture is transferred to the preheated blender jar and 10 milliliters of wash water sample, preheated to 200° F. is added to the blender jar. A choice of initial settings for the variable blender is made. The lid is closed, the jar is secured and the power is turned on for a selected period of time.

At the completion of the blending cycle, 100 milliliters of the treated and washed SCDM/Raw crude sample is transferred to a 100 ml centrifuge tube commonly referred to in the petroleum industry as an oil tube. The oil tube is immediately transferred to the water bath maintained at 200° F.

Alternatively, desalter simulating apparatus may be employed in preference to a water bath. In this event, the tube components, associated with the laboratory desalting simulator apparatus may be used and the simulating apparatus will serve as a heating device rather than the water bath. The desalting simulator apparatus delivers an electrical charge to the treated and washed sample thereby simulating electrostatic coalescence.

The oil tube or desalting simulator tube component, containing the sample, is placed in the water bath or simulating apparatus respective of the method used. The results of testing are described in terms of the so-called "Water & Sediment Drop". The settling of water and sediment volumes is recorded at selected intervals. This entails examining the treatment vessel and observing the amount of water and sediment that has settled to the bottom of the tube. The tube is calibrated such that volume of settled water or sediment is gauged. All variables described in the testing procedure may be adjusted through experience and iteration until such a time as the acceptable results are achieved in accordance with refinery specifications.

Generally, acceptable results have been obtained when the resulting water and sediment drop, i.e. the amount of BS&W found to be settled to the bottom of the oil tube, will directly correlate to the amount of BS&W contained in the sum total of raw crude, SCDM and wash water introduced by the original mixture.

Of particular importance is the rate of water and sediment drop achieved. For this reason, pursuant to placement of the oil tube or desalting simulator tube into the respective heating and settling apparatus, readings are taken at intervals of no more than five minutes apart. A relatively fast rate of water and sediment settling is preferable to slower settling rates.

A sample of the top 50 milliliters of the contents of the oil tube is carefully procured by the use of an appropriate syringe. The sample is tested for chlorides and BS&W according to standard refinery practices or according to ASTM procedures.

If the top 50 milliliters are tested and found to be within acceptable specifications and if the Water & Sediment Drop observed in the Oil Tube or desalter simulator tube component is found to correlate to a high degree with the total BS&W of the treated sample, then an efficient processing of the SCDM may be presumed, contingent upon the proper translation of bench model results to the commercial scale application.

Translating Bench Model Results to Commercial Scale Practice

Based upon the values determined in the bench model, commercial scale desalting of the mixed SCDM and crude oil may be accomplished. As will be understood by one of ordinary skill in the art, the conditions of the bench model should be repeated in the commercial scale process and all rates of the desalting process are performed within the teachings of the prior art.

Referring to FIG. 1, there is shown a desalting system in accordance with the present invention. The desalting process begins by retrieving crude oil from a crude oil storage tank 2 through a crude charge pump 4 and a crude oil feed line 10. Slipstreamed into the crude oil, upstream from the crude oil charge pump 4, is a feed of SCDM from a SCDM feed tank 6 which has been filled with SCDM retrieved from a slurry oil storage tank 8 and a demulsifier from an SCDM demulsifier injection 9. Alternatively, the SCDM could be slipstreamed into the crude oil downstream of the crude charge pump 4, but before a wash water injection point (described below). Optionally, also introduced into the crude oil is a demulsifier from a demulsifier supply 11.

The crude oil/SCDM mixture is then mixed with a quantity of wash water from a wash water supply 12 and pumped through a mix valve 14, in accordance with concentrations determined in the bench model. The crude oil/SCDM/wash water mixture is then pumped into a prior art desalter 16 where the crude oil/SCDM/wash water mixture is dehydrated and crude oil is removed from the top of the desalter 16 while BS&W is removed from the bottom of the desalter 16. The BS&W removed from the bottom of the desalter 16 contains the catalyst fines from the SCDM while dehydrated hydrocarbon is removed from the top of the desalter containing the hydrocarbons from the SCDM. Therefore, the hydrocarbons from the SCDM are recycled.

While the specific embodiments have been described, numerous modifications come to mind without significantly departing from the spirit of the invention, and the scope of protection should only be limited by the scope of the accompanying claims.

I claim:

1. A method for separating hydrocarbons from catalyst fines in a slurry oil/catalyst fines/diluent mixture (SCDM) comprising the steps of:
    removing SCDM from a slurry oil storage tank;
    combining the SCDM with crude oil entering a desalter in order to separate the slurry oil from the catalyst fines, whereby the desalter causes the hydrocarbon content of the SCDM to exit the desalter with dehydrated hydrocarbon from the crude oil while catalyst fines exit the desalter with basic sediment and water removed from the crude oil.

2. The method of claim 1 wherein the SCDM is added and mixed with demulsifier within a SCDM preparation tank.

3. The method of claim 1 wherein the slurry oil is heated to a desired temperature before combination with the crude oil.

4. A system for separating hydrocarbons from catalyst fines in a slurry oil/catalyst fines/diluent mixture (SCDM) comprising:
    a crude oil storage tank from which crude oil is retrieved;
    a SCDM mix tank containing a quantity of SCDM;
    a wash water supply;
    a mix valve;
    a demulsifier supply;
    a desalter capable of dehydrating hydrocarbon and removing basic sediment and water; and
    a crude oil feed line operatively attached to the crude oil storage tank, the SCDM mix tank, the wash water supply, the demulsifier supply, the mix valve and the desalter and whereby the SCDM mix tank is operatively attached to the crude oil feed line to introduce SCDM into the crude oil before the crude oil reaches the desalter.

5. The system of claim 4 wherein the system is adapted to heat the SCDM to a desired temperature before combination with the crude oil.

6. The system of claim 4 further comprising a crude charge pump.

7. The system of claim 6 wherein the SCDM is introduced prior to the crude charge pump.

8. The system of claim 6 wherein the SCDM is introduced after the crude charge pump but before the wash water supply.

* * * * *